United States Patent [19]

Meyering et al.

[11] 4,182,791
[45] Jan. 8, 1980

[54] PROCESS FOR MAKING A COMPOSITE BODY

[76] Inventors: Otto Meyering, Am Friedhof, 4286 Oeding; Wilhelm Schmidt, Eichendorffstrasse 5, 4280 Borken, both of Fed. Rep. of Germany

[21] Appl. No.: 889,916

[22] Filed: Mar. 24, 1978

[30] Foreign Application Priority Data

Mar. 30, 1977 [DE] Fed. Rep. of Germany ....... 2713989

[51] Int. Cl.$^2$ ..................... B32B 27/04; B32B 27/42
[52] U.S. Cl. .................................... 428/248; 156/279; 156/283; 156/309; 156/313; 428/246; 428/506
[58] Field of Search ............... 156/279, 283, 313, 309, 156/335; 428/246, 247, 248, 260, 506

[56] References Cited

U.S. PATENT DOCUMENTS

| 2,263,792 | 11/1941 | Wood | 428/78 |
| 2,625,499 | 1/1953 | Nebesar | 428/246 |
| 2,936,261 | 5/1960 | Cole | 156/309 |
| 3,900,360 | 8/1975 | Leatherman | 156/313 |

FOREIGN PATENT DOCUMENTS

| 2141472 | 5/1974 | Fed. Rep. of Germany . |
| 7118866 | 5/1971 | Japan . |
| 303898 | 4/1930 | United Kingdom . |

*Primary Examiner*—Jerome W. Massie
*Attorney, Agent, or Firm*—Merchant, Gould, Smith, Edell, Welter & Schmidt

[57] ABSTRACT

A composite body having a portion of a thermosetting material and a portion of a thermoplastics material is formed by including a layer of fabric having a serrated surface between the two portions as a connecting means. The fabric with its serrated surface facing outwards is applied to an area of a thermosetting material after which a thermoplastics material in particulate form is intimately mixed into the serrations of the fabric. The composite body, such as a weaving shuttle, is then pressed, fused and cured.

11 Claims, 2 Drawing Figures

PROCESS FOR MAKING A COMPOSITE BODY

FIELD OF THE INVENTION

The present invention relates to a process for the manufacture of a composite body including a portion of a thermoplastics and a portion of a thermosetting material and to a body made by the process. In particular the present invention relates to a process for making such a composite body having an intermediate layer between the thermosetting and the thermoplastics materials. The present invention is particularly applicable for example to the manufacture of shuttles for the weaving industry.

BACKGROUND OF THE INVENTION

In German Auslegeschrift No. 21 41 472, which is in the name of Gebruder Schmeing, there is disclosed a shuttle and a process for the manufacture thereof. This known shuttle comprises a thermoplastics body portion, lateral travel faces of the body portion being covered in a known manner with a thermosetting material. The manufacture of such a shuttle includes the provision of a fabric web between the thermoplastics portion and the thermosetting material, the layers being held together by adhesive between the fabric web and the thermosetting material.

The development of this known shuttle arose from the need to make possible for high-speed weaving looms the utilisation of a shuttle having a body portion made from a thermoplastics material reinforced in a known manner by means of a thermosetting material.

To achieve such an arrangement, a starting consideration is that an essential portion of the shuttle is formed by a basic body which is made from a thermoplastics material and is already preformed. To provide abrasion resistance and some degree of heat protection, the thermosetting material is applied to outer sides of this basic body. However the application and secure connection of the thermosetting material to the thermoplastics material give rise to some difficulties. According to the proposal of German Auslegeschrift No. 21 41 472, these difficulties are obviated in that the shuttle's basic body portion of thermoplastics material is, subsequent to being manufactured as a separate entity, fused to form a liquid plastics mass into which is inserted a fabric web intended together with the adhesive to act as a connection between the thermoplastics and the thermosetting portions.

However it has been found in practice that the process disclosed in German Auslegeschrift No. 21 41 472 does not produce a shuttle which operates to the satisfaction of persons skilled in the art, since the connection between the thermoplastics material and the thermosetting material could not be adequately secured.

SUMMARY OF THE INVENTION

It is an object of the present invention to provide a process in which a connection between a thermoplastics material and a thermosetting material can be adequately and securely established. It is a further object of the present invention to provide a composite body having a reliable and fixed connection between a portion of thermoplastics material and a portion of thermosetting material which can be produced advantageously with respect to costs. It is a further object of the present invention to provide a weaving shuttle formed from such a composite body.

According to the present invention there is provided a process for making a composite member having a portion of thermoplastics material and a portion of thermosetting material comprising the steps of:

(i) impregnating fabric with a liquid thermosetting material
(ii) drying the impregnated fabric
(iii) piling the dried, impregnated fabric in the form of sheets to form a thermosetting laminate or themoset assembly
(iv) applying on at least one surface of the laminate a layer having a serrated surface on the side away from the laminate
(v) applying to the said serrated surface the thermoplastics material in particulate form
(vi) applying pressure and heat to the composite assembly so formed to cure the thermosetting laminate, fuse the thermoplastics material and bond the composite assembly together in the desired form.

A suitable thermosetting material for use in the process is a phenol resol in liquid form. By "layer having a serrated surface" is meant a layer, particularly a fabric, whose surface is capable of accepting, at least to a certain extent, a material applied to it in particulate form. Layers which can appropriately be used include, for example, pile fabrics such as plush or velvet, cord fabrics, frotte, bucle, etc., fur-like fabrics, suitably roughened wooden slats and plastic webs and the like. Alternatively materials can be used which have a laminar structure obtained by electrostatic layering.

When the required number of sheets of impregnated fabric have been built up and the layer having a serrated surface has been applied thereto, the thermoplastics material in particulate form is preferably applied to the fabric's serrated surface so that the thermoplastics material is intimately mixed with the fabric within its serrations and then deposited to the desired thickness. Pressure is then applied to this composite assembly, preferably accompanied by heating, to give it a specific and predetermined shape. This shaped body is then subjected to a fusing step, for example, at a temperature from about 180° C. to about 220° C. and is cured. The cured body can then be adapted to whatever use it is desired to be put, e.g. a weaving shuttle. The entire process can of course be arranged to produce a shaped body already adapted to be turned into the desired product such as the shuttle.

The process of the present invention can be applied to more than one area of the thermosetting material to produce a composite body having a plurality of sides builtup with thermoplastics material. Conversely a sandwich of thermoplastics material between thermosetting material can readily be achieved.

The use of a layer of fabric, having a serrated surface, as the connection between the thermosetting and the thermoplastics materials so that the serrated surface engages the thermoplastics material ensures that a firm and close bond can be formed between the two materials. If desired a fibrous material such as cotton fibres or fabric shreds can be mixed with the particulate thermoplastics material before it is applied to the serrated surface of the said layer of fabric.

Suitable materials for use in the present process are, for example, a phenol resol as the thermosetting material and a high molecular weight, low pressure polyethylene as the thermoplastics material. By use of the present process a reliable bond between such a thermosetting material and a thermoplastics material can be achieved which is advantageous with regard to cost, abrasion resistance and heat conductivity. Composite bodies produced by the process can, of course, be employed in technical fields other than the weaving industry.

DESCRIPTION OF THE PREFERRED EMBODIMENTS

Figure 2:
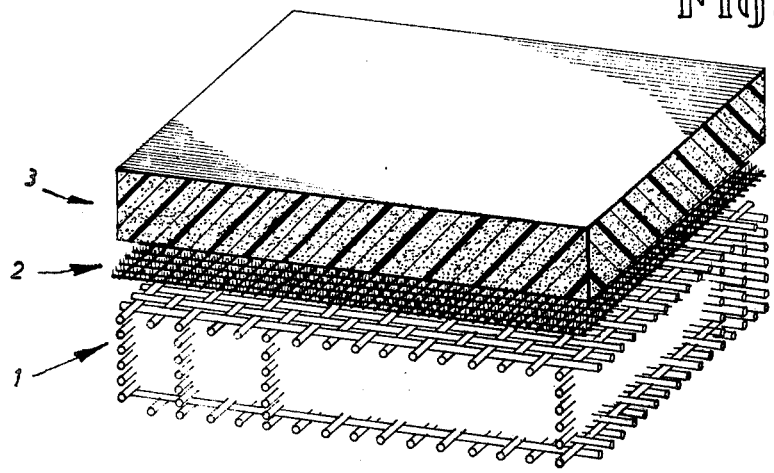
Figure 1:
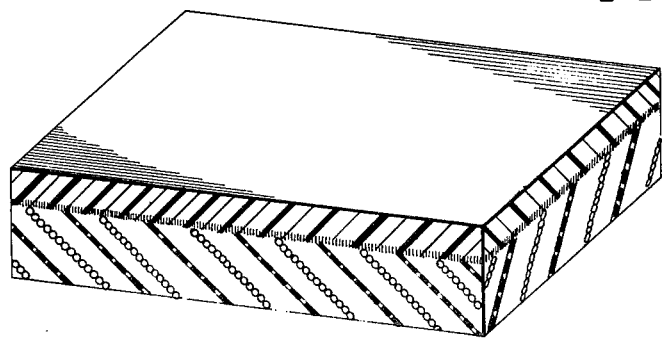

In the drawings:

FIG. 1 is an exploded view of a composite body embodying the present invention; and FIG. 2 shows the body of FIG. 1 in a compressed, finished form.

Referring to FIGS. 1 and 2, reference numeral 1 indicates a block which comprises a plurality of stacked fabric webs impregnated with a thermosetting material such as a phenol resol resin. In order to make this block a woven cotton fabric web was passed continuously through a liquid phenol resol solution contained in a 300-liter tray some 60 to 70 cm long. The fabric web was then passed through a heater at 110°–130° C. to evaporate the solvent.

The dry impregnated fabric was then cut into convenient lengths and piled to form a laminate or thermoset assembly, the number of layers in the pile (6 or 7 layers are shown in FIG. 1) depending on the ultimate thickness of thermosetting material needed.

A web 2 of plush, of the same size as the piled up impregnated fabric was laid on top of this with its pile (i.e. its serrated side) uppermost. Then a thermoplastics material 3 in particulate form was piled up on top of the web 2 in a container having sides which retain the particles in position over the other materials. It is preferred to use for this purpose the lower part of a die by means of which pressure can be applied to the top of the assembled materials.

The thermoplastics material used was a high molecular weight, low pressure polyethylene supplied by Ruhrchemie AG. It must be applied in particulate form and may be in the form of quite a fine powder, the particles being small enough to penetrate readily through the pile of the plush.

Pressure was applied to the top of the thermoplastics material with mild heating to form a coherent body. This could then be moved or stored, taking some precautions as it was still readily frangible.

To form a block, as shown in FIG. 2, the coherent body was cut to the desired size, inserted in a mold, and heat and pressure applied to cure the thermosetting laminate, fuse the thermoplastics material and bond the assembly together. A pressure of some 1500 p.s.i. and a temperature of 175°–200° C. held for one hour is sufficient for the purpose.

Various modifications may be made to this method. The step of pressing to form a coherent body need not be done as a separate step: if more convenient the piled laminate, plush and thermoplastics can be immediately pressed and heated in a mold at a pressure and temperature which will cure the thermosetting laminate, fuse the thermoplastics material and bond the assembly together. Instead of making a plain block as shown in FIG. 2, the mold may be shaped to give the final shape of an article to be made from the composite material.

If it is desired to make a sandwich material, e.g. with thermoplastics material in the center and thermosetting resin on each side, this can be done in two different ways. Firstly, having piled the particulate thermoplastics material to the required depth a further piece of plush may be added, pile side down, this being followed by further layers of dry fabric impregnated with thermosetting material. In locating the plush over the thermoplastics, care must be taken to try to get the pile of the plush into the particles of thermoplastics. When the top laminate or thermoset assembly is in position, the assembly can be processed as indicated above.

The second method is to make an assembly of laminated thermosetting material, plush and thermoplastics, apply pressure to make these elements cohere, and to take two pieces of this coherent body, place them in juxtaposition with the thermoplastics materials towards each other, and complete the stages of heating and pressing as outlined above.

What is claimed is:

1. Process for making a composite member having a portion of thermoplastics material and a portion of thermosetting material comprising the steps of:
   (i) impregnating fabric with a liquid thermosetting material;
   (ii) drying the impregnated fabric;
   (iii) piling the dried impregnated fabric in the form of sheets to form a thermoset assembly;
   (iv) applying on at least one surface of the thermoset assembly a layer having a serrated surface;
   (v) applying to the said serrated surface the thermoplastics material in particular form;
   (vi) applying pressure and heat to a composite assembly so formed to cure the thermosetting laminate, fuse the thermoplastics material and bond the composite assembly together in the desired form.

2. Process as claimed in claim 1 wherein the layer with the serrated surface and then the thermoplastics material is applied on both sides of the thermosetting "laminate" to produce a composite member with thermoplastics material on each side of the thermosetting material.

3. Process as claimed in claim 1 including the further steps between steps (v) and (vi) of superposing an additional layer having a serrated surface directly on the surface of the thermoplastics material and then applying a further assembly of dried fabric impregnated with thermosetting material on said additional layer whereby to produce a composite member with thermosetting material on each side of the thermoplastics material.

4. Process as claimed in claim 1 including the additional step (v') between steps (v) and (vi) of pressing the materials together to form a coherent body.

5. Process as claimed in claim 4 including the additional step (v'') between steps (v') and (vi) of taking two portions of coherent body resulting from step (v') and juxtaposing these portions with their thermoplastics materials towards each other.

6. Process as claimed in claim 1 wherein a fibrous material is mixed with thermoplastic material in particulate form prior to its application to the said serrated surface.

7. Process as claimed in claim 6 wherein the fibrous material consists of cotton fibres.

8. Process as claimed in claim 6 wherein the fibrous material consists of fabric shreds.

9. Process as claimed in claim 1 wherein the thermosetting material is a phenol resol resin.

10. A composite member made by the process as claimed in claim 1.

11. A composite member as claimed in claim 10 wherein the composite member is a weaving shuttle.

* * * * *